Figure 1:
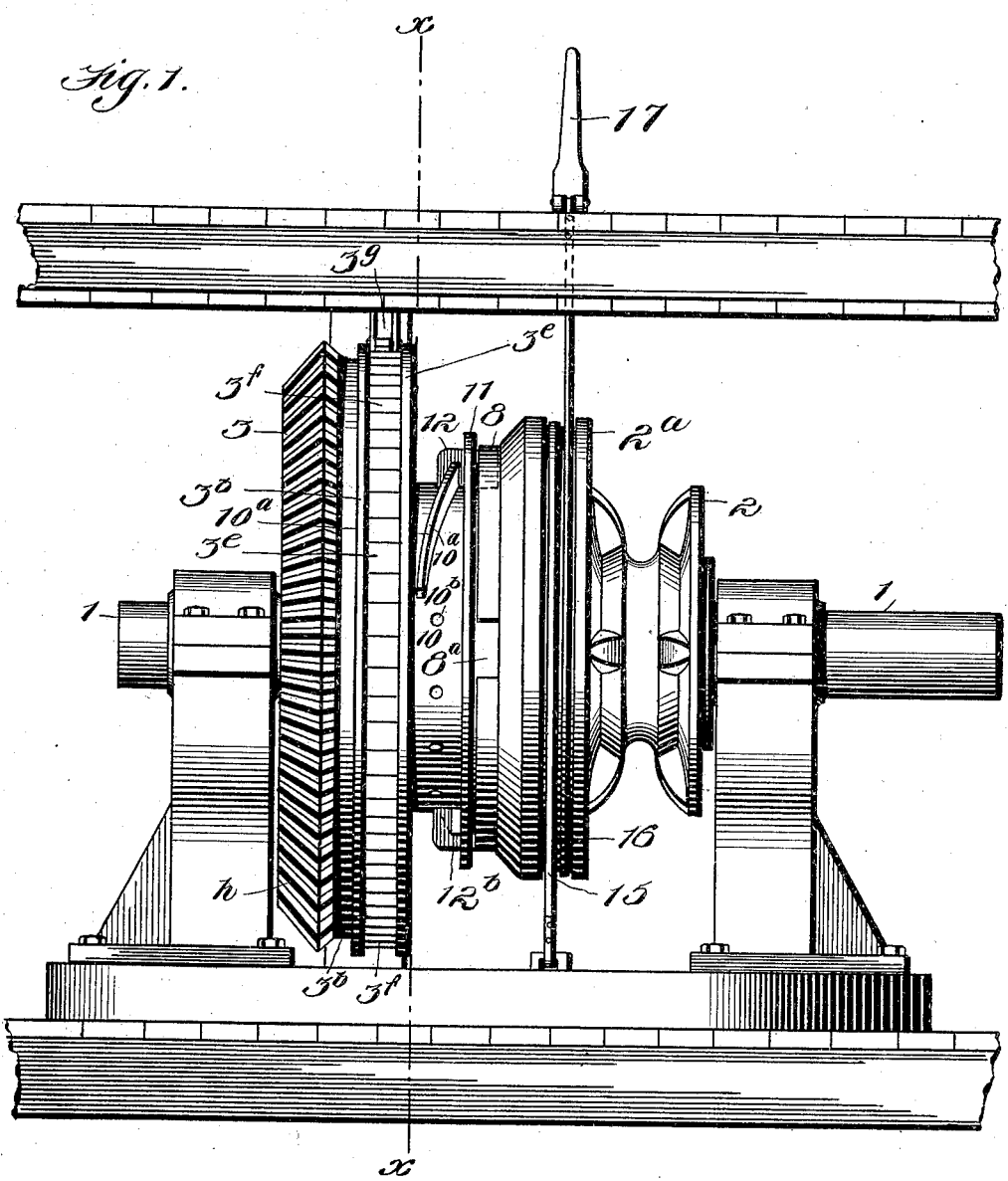

No. 708,455. Patented Sept. 2, 1902.
C. W. BLAKE.
SHIP'S WINDLASS.
(Application filed May 11, 1901.)
(No Model.) 4 Sheets—Sheet 2.

Witnesses Inventor:
Charles W. Blake
Attorneys

No. 708,455. Patented Sept. 2, 1902.
C. W. BLAKE.
SHIP'S WINDLASS.
(Application filed May 11, 1901.)
(No Model.)
4 Sheets—Sheet 3.

Witnesses
Inventor:
Charles W. Blake
Attorneys

No. 708,455.

C. W. BLAKE.
SHIP'S WINDLASS.
(Application filed May 11, 1901.)

Patented Sept. 2, 1902.

(No Model.)

4 Sheets—Sheet 4.

Witnesses

Inventor:
Charles W. Blake

Attorneys

UNITED STATES PATENT OFFICE.

CHARLES W. BLAKE, OF PORT REPUBLIC, NEW JERSEY.

SHIP'S WINDLASS.

SPECIFICATION forming part of Letters Patent No. 708,455, dated September 2, 1902.

Application filed May 11, 1901. Serial No. 59,782. (No model.)

*To all whom it may concern:*

Be it known that I, CHARLES W. BLAKE, a citizen of the United States, residing at Port Republic, in the county of Atlantic and State of New Jersey, have invented certain new and useful Improvements in Ships' Windlasses, &c.; and I do hereby declare the following to be a full, clear, and exact description of the invention, such as will enable others skilled in the art to which it appertains to make and use the same.

My invention relates to improvements in ships' windlasses or, as it may be termed, a "ship's appliance," because the improved compensating devices may be used in connection with drums, wildcats or chain-wheels, capstans, winch-heads, or any other power or transmitting appliance.

In towing-machines and other forms of windlasses which have preceded my invention it is customary to employ a drum, wildcat, chain-wheel, or other revoluble power element which is cushioned by fluid-pressure compensating mechanism, so as to pay out the hawser or chain when strain is exerted thereon by the surging influence of the waves on the vessel and so take up the slack in said hawser or chain when the strain is eased. While such prior devices are efficient and are well adapted for vessels having an available supply of steam or other pressure fluid, yet there are many places where the fluid-pressure supply is not available and still it is desired to use an appliance capable of giving the compensating action to the hawser or cable by mechanical devices acting alone and independently of fluid-pressure.

The object of the present invention is to provide mechanical appliances which will compensate for or neutralize sudden or abrupt strains or jerking motion—for example, such as is produced by the surge of the sea or as in weighing anchor—in order to guard against the parting or breaking of the hawser, the chain, or the windlass.

A further object of the invention is to provide a ship's appliance which shall have its coöperating parts so arranged that when the strain is such as to exhaust the compensation action of the primary load-take-up member or element, which makes an allowance for a certain amount of stress or strain on the hawser or chain, an additional or reserve compensating action will be subsequently brought into service through a subsequently-effective and normally-inactive member or element, thus making provision for taking up the maximum stress or strain to which the chain, hawser, or apparatus may be subjected.

To the accomplishment of these ends my invention consists, broadly, in the combination, with a shaft, of a compensating load-take-up member carried by the shaft, and a subsequently-effective member also carried by the shaft and brought into service by the turning movement of the shaft itself under stress or strain on the primary member beyond the compensating capacity of said member.

The invention further consists in the combination, with a shaft, of a primary load-take-up member having a shaft-section made fast with the shaft and a yieldingly-cushioned rim-section operatively related to said shaft-section to be capable of a limited turning movement relative thereto, and a normally-inactive yieldable member having a shaft-section also fast with the shaft and a cushioned rim-section capable of a limited yieldable play relative to the shaft member, said sections of the normally-inactive member being brought into service through the reverse action of the shaft itself and under stress or strain on the load-take-up member beyond its compensating capacity. Each of said members, the load-take-up member and the normally-inactive subsequently-effective member, are provided with springs or equivalent cushion devices; but to secure the best results the springs of the subsequently-effective member may be of higher tension than the springs of the load-take-up member, or said springs of the subsequently-effective member may be placed at a greater radial distance from the shaft than the springs of the load-take-up member.

The invention further consists in a novel and peculiar construction of the load-take-up member, and a like construction of the power-gear, which forms the subsequently-effective or normally-inactive member.

The invention further consists in the novel organization, with the load-take-up member, of a clutch mechanism which is intimately associated with said member so as to make it fast to the shaft, or to allow said member to run or play idly thereon.

The invention further consists in the combination, construction, and arrangement of parts which will be hereinafter fully described, and defined by the claims.

In order to enable others to understand my invention, I have illustrated a practical embodiment thereof in the form of a riding or anchorage windlass; but it will be understood that the principle may be utilized in connection with drums, capstans, winch-heads, and other revoluble elements other than the particular form of wildcat or chain-wheel shown by the drawings.

Figure 2:
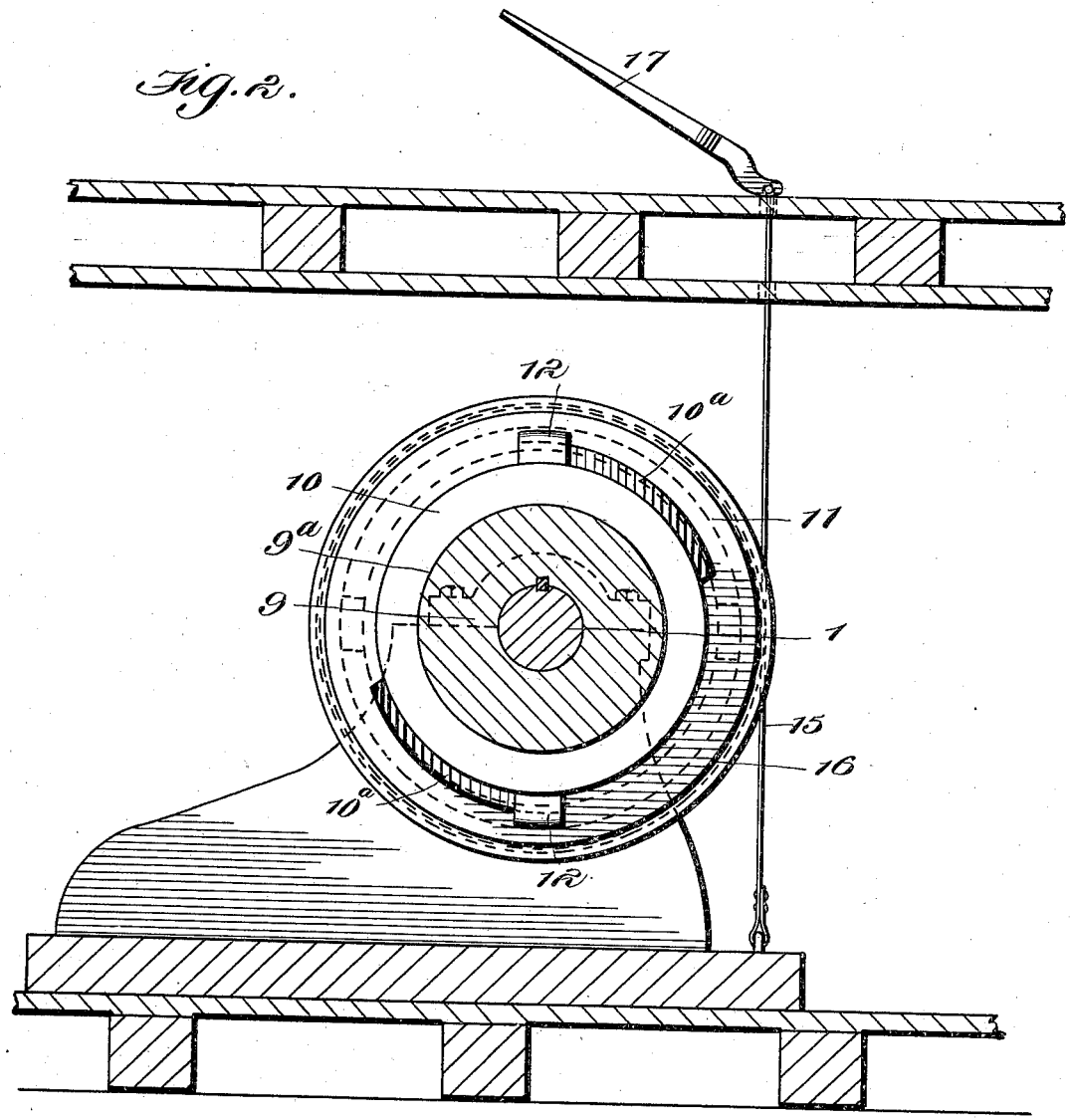
Figure 5:
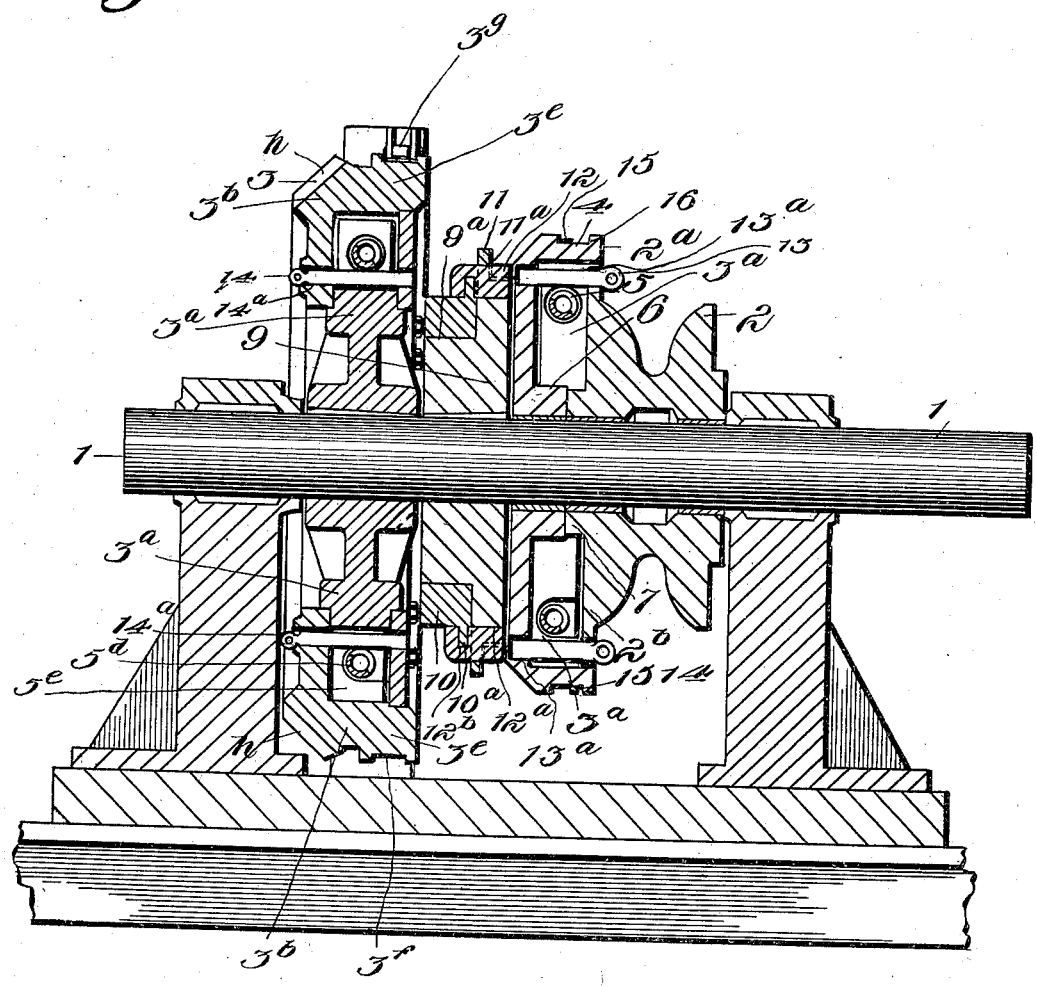
Figure 4:
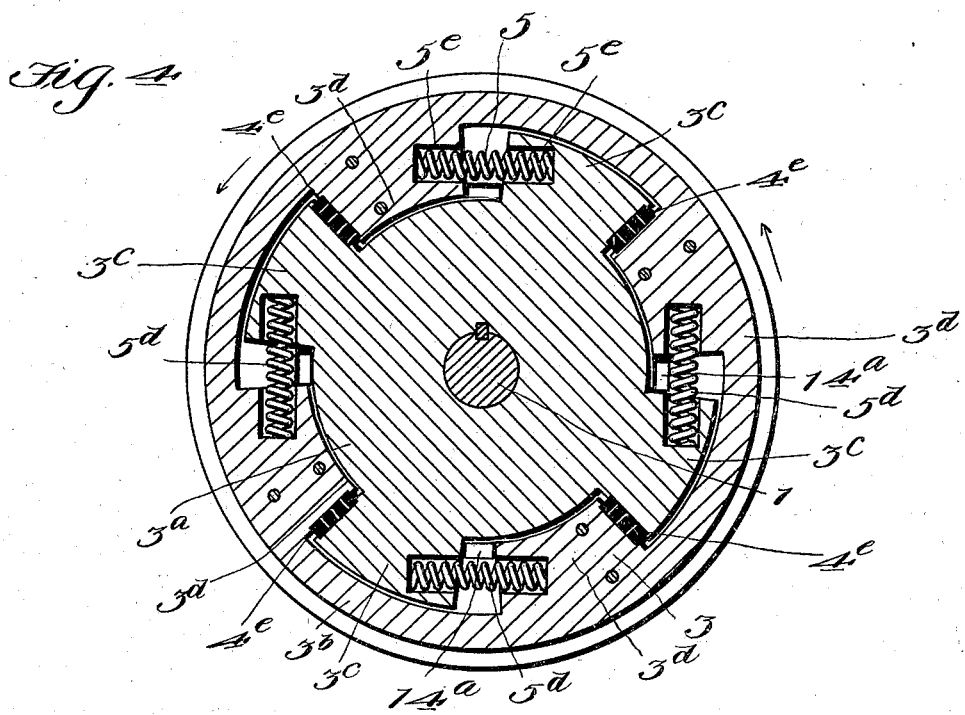
Figure 5:
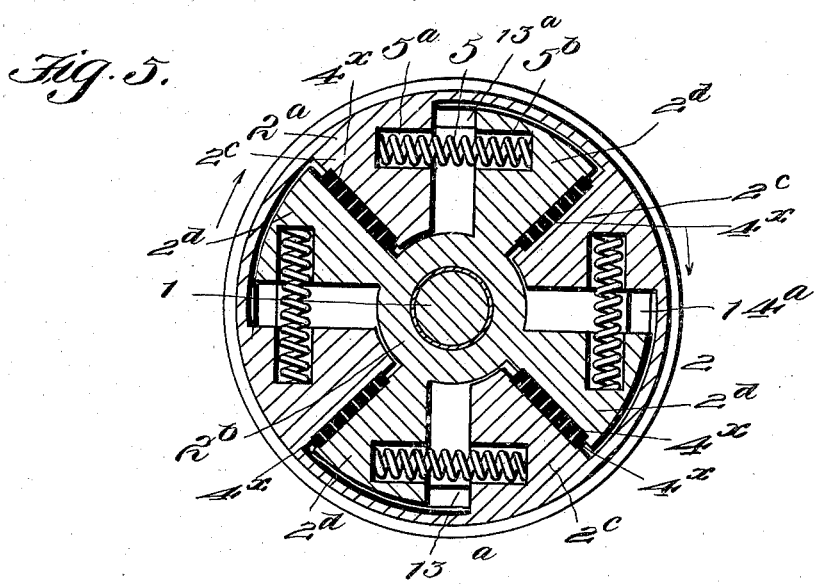

Figure 1 is a side elevation of so much of a ship's windlass, preferably of the wildcat type, as is necessary to disclose the preferred embodiment of the invention. Fig. 2 is a vertical transverse section taken in the plane indicated by the dotted line $x\,x$ of Fig. 1. Fig. 3 is a longitudinal section taken in plane of the windlass-shaft. Fig. 4 is an enlarged detailed view showing the yielding or cushioned parts forming the power-gear which constitutes the subsequently-effective or normally-inactive member of the compensating mechanism. Fig. 5 is a similar view of the parts comprising the wildcat or chain-wheel that forms the primary load-take-up member.

The same letters and numerals are used to indicate like and corresponding parts in each of the several figures of the drawings.

1 designates the shaft, which is mounted in suitable bearings on the bed-plate of the machine.

2 is the wildcat or chain-wheel, and 3 is the power-gear, the latter adapted to be driven from a shaft or from an engine of any suitable kind for the purpose of driving the shaft 1 and of thereby rotating the wildcat or chain-wheel 2, so as to wind a chain, cable, or hawser on the wildcat or its equivalent. In the appended description I shall set forth my invention as embodied in a riding or anchorage windlass for use on ships in controlling and handling the anchor-chain; but it is to be understood that the principle of the shaft and the reversely-acting members may be utilized in the construction of other machines or apparatus wherein provision must be made for taking up the maximum stress or strain of a hawser, cable, or chain. It is to be understood, furthermore, that the wildcat or chain-wheel 2 constitutes the primary member or the load-take-up member, from the fact that the strain of the hawser or chain is exerted directly thereon; furthermore, that the power-gear 3 constitutes the subsequently-effective compensating member, which when driven in one direction is adapted to propel the shaft 1 and the chain-wheel 2; but when the shaft is turned in a backward direction by an excessive strain on the primary member 2 said member 3 is adapted to bring into the train of connections a reserve compensating action sufficient, in connection with the resistance of the primary member 2, to successfully withstand the maximum strain that may be brought upon the member 2 through its chain or hawser. For the purposes of the present specification the part which is adapted to engage with the chain-wheel or wildcat will hereinafter be designated as a "chain;" but it will be understood that any equivalent for this chain may be used—such, for example, as a hawser, a cable, or any similar flexible connection. If a flexible connection other than a chain is employed, the member 2 should be given a form or construction adapted for the reception of the particular type of flexible connection so employed—as, for example, if a cable is used a drum with grooves may be employed in lieu of the chain-wheel.

I will first proceed to describe in detail the chain-wheel or wildcat 2, which is shown more particularly by Figs. 1, 3, and 5 of the drawings. This wildcat is not made in one solid piece, as is common in the art, but is divided into sections $2^a\,2^b$, both of which are loosely mounted on the shaft 1. The section $2^b$ is formed with a peripheral groove or deep channel adapted for the reception of the chain in the usual manner. The sections $2^a\,2^b$, forming the compensating wildcat, are disposed on the shaft in close lateral relation, and said sections are provided on their opposing faces with hub-like extensions or bosses, which extend toward each other and serve to keep said sections in the desired laterally-spaced relation. The hub or boss of the extension $2^b$ is indicated at 7 in Fig. 3, while the hub or section of the section $2^a$ is indicated at 6 in the same figure. The sections $2^a\,2^b$ are further provided on their opposing faces with the lugs or segments $2^c\,2^d$, one series of said lugs being on the section $2^a$ and the other series being on the other section $2^b$. One series of lugs on one section is disposed in alternate relation to the other series of lugs on the other section, and the lugs of the two series are disposed in the overlapping and spaced relation shown more clearly by Fig. 5 of the drawings. The two series of lugs on the companion sections of the wildcat are spaced between some of their edges, so as to allow the section $2^a$ to have a limited movement relative to the other section $2^b$; but normally the parts are kept in active relation through the resistance of the cushion devices 5, which are preferably in the form of coiled springs, although blocks of rubber or other compressible material may be employed. As shown, the springs 5 have their ends seated in sockets $5^a$, provided in the lugs of one of the wildcat-sections, while their other ends are seated in sockets $5^b$, provided in the lugs of the other companion section, whereby the springs are retained in place by the sockets, and they are adapted to be compressed when the section $2^a$ is subjected to strain of the chain fitted in the groove thereof. When the wildcat or chain-wheel is propelled by the shaft, the strain of the shaft is exerted through the clutch on the shaft-section $2^a$ to drive the latter in the direction indicated by the arrows in Fig. 5, and to minimize the jarring effect of the shaft-section $2^a$, acting against the grooved member $2^b$, I employ the compressible cushions $4^\times$, which are interposed between those edges of the two series of lugs on the companion sections of the wildcat which are not occupied by the cushion or compensating springs 5. These compressible cushions $4^\times$ also reduce the jar and strain exerted by the lugs of the member $2^b$ on the lugs of the companion member $2^a$ when the parts resume their normal relations following the relaxation of the strain of the chain on the section $2^b$. The section $2^a$ is provided with an annular rim or flange 4, disposed to inclose or house the two series of lugs, the compensating springs, and the cushions which are disposed between the lugs for service in the manner described. The other section $2^b$ is provided with a flange or rim 8, having at suitable intervals the notches or openings $8^a$, which are adapted to partially receive the dogs of the clutch mechanism, which I will now proceed to describe. Said flange 8 projects from that side or face of the member $2^b$ opposite to that face having the lugs $2^d$, as shown by full lines in Fig. 1 and by dotted lines in Fig. 3.

9 designates a clutch head or disk which is fitted on the shaft next to the section $2^a$ of the wildcat, and this head or disk is made fast with the shaft by means of a suitable key or spline, as shown by Fig. 3. This head or disk is formed with a step $9^a$ of small diameter, said step being provided on the peripheral edge of the head which lies remote to the wildcat. On this step is loosely mounted a clutch-dog shifter in the form of a cam-ring 10, which is adapted to be turned by hand on the head or disk. This cam-ring is provided with the external spiral ribs $10^a$, adapted to be loosely engaged with the clutch-dogs 12, and the cam-ring 10 is furthermore provided with the sockets $10^b$, into either of which may be inserted a hand-bar, which is adapted to partially turn the ring on the clutch-head. That part of the clutch-head which exceeds the step $9^a$ in diameter forms an annular flange 11, which is formed at suitable intervals with the slots or openings $11^a$, adapted for the passage of the clutch-dogs 12. Upon the periphery of the cam-ring are arranged a number or series of sliding dogs 12, which are let into transverse recesses or seats $12^a$ in the head or disk 9, said dogs being adapted to slide through the slots or openings $11^a$ in the flange 11 and to engage with the notches $8^a$ of the flange 8 of the wildcat-section $2^b$, whereby the dogs are adapted to make the clutch-head 9 and the wildcat-section $2^b$ fast with one another in order that the wildcat may be coupled to the shaft 1, so as to be driven thereby. By reversing the cam-ring, however, the ribs thereof are adapted to withdraw the slidable dogs from engagement with the section $2^b$ of the wildcat, and the two sections of the wildcat are thus allowed to turn or rotate idly upon the shaft. The clutch-dogs 12 and the cam-ribs $10^a$ of the cam-ring are connected together by arranging the ribs $10^a$ to fit snugly in the grooves $12^a$, which are provided in the under sides of the dogs 12, thus making provision for clutching the wildcat to or unclutching it from the shaft 1. The two sections $2^a$ $2^b$ of the wildcat may be coupled rigidly together by means of the plug or key 13, adapted to be inserted into registering recesses or notches $13^a$, which are produced in the two parts or sections of the wildcat, whereby the sections are prevented from having any compensating movement relative to each other, which is desirable in the service of the windlass when the vessel is anchored in harbors, rivers, or other comparatively still bodies of water. The power-gear 3, which is carried by the shaft 1 at a point adjacent to the clutch head or disk 9, consists of two concentric members $3^a$ $3^b$. The shaft-section $3^a$ is of annular or ring-like form, as shown by Fig. 4, and is disposed in concentric surrounding relation. Like the wildcat 2, the power-gear has its separate sections $3^a$ $3^b$ provided with series of lugs or segments $3^c$ $3^d$, arranged for the lugs of one section to occupy an overlapping relation to the lugs of the other section, as also shown by Fig. 4. The two series of lugs on the sections of the power-gear are provided with the cushion-springs $5^d$, let into sockets $5^e$ of the lugs in a manner similar to the wildcat, and the back-to-back edges of said lugs forming the two series have cushion-strips $4^e$. The rim-section $3^b$ of the power-gear is formed with a continuous series of bevel-gear teeth $h$, as shown by Figs. 1 and 3, with which is adapted to mesh a bevel-gear on a driving-shaft or a motor-shaft for the propulsion of the gear 3 as an entirety, and this gear is limited by suitable detents or pawls to turn in the direction indicated by the arrows in Fig. 4, so that the strips $4^e$ will be compressed by and between the lugs $3^c$ $3^d$, thus relieving to a considerable extent the strain or pressure on the compensating springs $5^d$ of said gear 3. The motion of the rim-section $3^b$ is thus given directly to the shaft-section $3^a$, which is made fast with the shaft, so as to turn the latter, and when the wildcat is engaged by the dogs 12 with the clutch-head the motion of the shaft is transmitted by the clutch to the wildcat for the purpose of driving the latter in a direction to coil or take up the cable or chain on said wildcat. The sections $3^a$ $3^b$ of the power-gear are adapted to be coupled rigidly together by any suitable means, such as by the key or block 14, adapted to be fitted in the registering recesses or notches $14^a$ of the companion sections, thus uniting the sections in a manner to prevent the limited play of the shaft-section $3^a$ relative to the rim-section $3^b$. The rim-section $3^b$ is furthermore provided with a lateral circular extension $3^e$, the same being of the annular shape shown by the drawings. This circular extension is provided on its outer or exposed face with a series of teeth or serrations $3^f$, which form a ratchet-surface around the power-gear, and with this ratchet engages a series of detents or pawls $3^g$, the same being pivotally supported on a post or posts adjacent to the power-gear or in other suitable ways. This ratchet-and-pawl device coöperates to restrain the power-gear from rotating in a backward direction or opposite to the arrows of Fig. 4.

It will be understood that the rim-section of the power-gear may be provided with other forms of gear-teeth than the bevel-teeth herein shown and also that this power-gear may be driven by any means other than by the gearing heretofore described.

The wildcat has one of its members provided with a brake-surface 16, which is encompassed by a brake-band 15, the latter having one end secured to the bed of the machine, while the other end of the band is connected to a lever 17, suitably placed for the operation of the brake mechanism. It is evident that the wildcat when disconnected from the clutch may turn freely and rapidly on the shaft 1 in order to pay out the chain when casting the anchor; but the speed of rotation of the wildcat may be retarded by the application of the brake mechanism in an obvious manner.

It is obvious that the wildcat may be unclutched from the shaft 1 and controlled by the brake when it is desired to drop the anchor, thus allowing the chain to be paid out at the desired speed, the wildcat running freely on the shaft. Said wildcat can be arrested or stopped at any time by forcible application of the brake, and the strain, however great, is brought on the yieldable wildcat and, through the shaft, on the power-gear, thus compensating for the strain and obviating the liability of breakage of the parts, thereby securing a result not possible with other forms of riding-gears known to me. When the ship is at anchor, the strain on the cable due to the surging of the sea and the motion of the ship is taken up by the springs of the wildcat within the capacity of the latter, and under such conditions the strain on the chain turns the rim-section in an opposite direction to the arrow in Fig. 5, thereby compressing the springs. Again, if the ship should have headway and be in a narrow or dangerous place the paying or running out of the chain can be stopped suddenly, throwing the surge or strain on the spring-cushioned wildcat, and under some circumstances on the gear, thus avoiding all danger of parting the chain or of damage to other parts.

It will be observed that where the strain may be so great as to exhaust the compensating action or capacity of the wildcat, which makes an allowance of three inches of slack in the chain, more or less, according to the size of the windlass, the compensating action of the power-gear will be brought into play, making an allowance of an additional three inches of slack, more or less, thus providing a strength equal to about five (5) tons above the parting or breaking point of the cable or chain. This bringing into service of the subsequently-effective section or member is brought about through the agency of the shaft on which the wildcat and the power-gear are both mounted. In the service of the wildcat the sections thereof will be brought close together, so as to compress the springs up to their capacity, and the two sections will turn together, and thereby turn the shaft 1. This motion of the shaft is communicated to the shaft-section $3^a$ of the power-gear, which will be turned by the shaft in an opposite direction to the arrow in Fig. 4, and as the rim-section $3^b$ of the power-gear is held by the pawls from turning in a backward direction the springs 5 of the power-gear will be compressed by and between the lugs of the companion sections of the power-gear. On relaxation of the sudden or excessive strain the springs return the sections of the power-gear and of the wildcat to their normal positions.

Having thus described my invention, what I claim as new, and desire to secure by Letters Patent, is—

1. In an apparatus of the class described, the combination with a shaft, of a compensating load-take-up member thereon, and a subsequently-effective member controlled by the shaft and brought into service thereby under excessive strain on the first-named member.

2. In an apparatus of the character described, the combination of a shaft, a compensating load-take-up member, and a driving compensating member operatively connected through the shaft with the first member to drive the latter in one direction and subsequently brought into service by the take-up member under excessive strain, thereon.

3. In an apparatus of the character described, the combination of a shaft, a compensating load-take-up member thereon, and a driving compensating member connected to the shaft for propelling the latter and the load member and adapted to be brought into service through reverse motion of the shaft under strain which exhausts the compensating capacity of the load member.

4. In an apparatus of the character described, the combination of a shaft, a load-take-up member thereon, a compensating driving member on the shaft, and means for limiting the driving member to rotation in one direction.

5. In an apparatus of the character described, the combination of a shaft, a load-take-up member idly mounted thereon, a clutch arranged to make one section of said load member fast with the shaft, and a compensating driving member on the shaft arranged to be brought into service through backward motion of the shaft.

6. In an apparatus of the character described, the combination of a shaft, a two-part load-take-up member having one section made fast to the shaft and said parts adapted to have a limited turning movement relative to one another, and a two-part cushioned driving member, one part of which is fast with the shaft and adapted, on backward movement of the shaft, to automatically bring the cushions into service.

7. In an apparatus of the character described, the combination of a shaft, a two-part cushioned load member thereon, and a two-part power-gear having cushion devices arranged to be brought into service by the backward motion of the shaft.

8. In an apparatus of the character described, the combination of a shaft, a two-part cushioned load member thereon, a two-part power-gear having cushion devices and fitted to said shaft, and means to restrain the power-gear from turning in a backward direction.

9. In an apparatus of the character described, the combination with a shaft, of a compensating member having two sections, one of which is revoluble with the shaft and the other is provided with a ratchet, a pawl engaging said ratchet, and cushion devices between the sections of said member.

10. In an apparatus of the character described, the combination with a shaft, of a compensating member having two sections and intermediate cushion devices between said sections, a clutch for making one section fast with the shaft, a brake-surface on one section of the member, and a movable brake element in coöperative relation to the brake-surface and adapted to control the rotation of the member when unclutched from the shaft.

11. The combination with a shaft, of a wildcat or chain-wheel comprising a member loose on the shaft and provided on one side with a series of lugs or abutments and on its other side with a laterally-extending coupling-section, and a companion member also idly fitted to the shaft and provided with lugs or abutments disposed in opposing relation to the corresponding lugs on the first-named member, cushion devices between the opposing lugs of the two members, a clutch-head fast with the shaft, a series of locking-dogs slidably mounted in the clutch-head and arranged for engagement with the coupling-section of one shaft member, and a cam-ring carried by the clutch-head and engaging with said locking-dogs.

12. The combination with a shaft, of a wildcat or chain-wheel having companion members both fitted loosely on said shaft, said members being provided on their opposing sides or faces with lugs or abutments which are projected laterally into opposing relation, a series of cushion-springs each fitted between two of the faces of a pair of lugs in the respective members to cushion the relative movement thereof when the wildcat turns in one direction, a series of other cushion devices each fitted between other opposing faces of the pair of abutments of the respective members to cushion the relative movement thereof when the wildcat turns in the opposite direction, and means for making one member of the wildcat fast with the shaft.

13. In apparatus of the character described, the combination of a driven shaft, a wildcat or wheel adapted to receive the stress or strain of a chain or hawser and comprising sections movable one within the plane of the other and springs arranged between said sections, and a clutch or coupling comprising a disk fixed or keyed to said shaft, a cam-ring carried by said disk, and lugs or dogs actuated by said cam-ring and carried by said disk and engaging said wildcat or wheel, substantially as set forth.

14. A wildcat loosely supported upon a driven shaft, and having a lateral coupling-section provided with internal abutments and an independent, movable coupling-section connected to said shaft as against rotation and having counterpart abutments yieldingly connected to the aforesaid abutments, and a movable ring mounted upon one of said sections and having a spiral peripheral rib and a dog engaging said rib and the other one of said sections, substantially as set forth.

15. In apparatus of the character described, the combination of a driven shaft and a wildcat or wheel adapted to receive thereon the stress or strain of a chain or hawser, and comprising sections or parts movable one with the other and springs arranged between said sections, and a locking plug or key engaging sockets or openings in the sections of said wildcat to couple or connect up said sections, substantially as set forth.

16. A wildcat loosely supported upon a driven shaft, and comprising yieldingly-connected-together sections, a power-gear fixed upon said shaft and comprising yieldingly-connected-together sections, and a coupling device for effecting connection between said wildcat-sections and said shaft, substantially as set forth.

In testimony whereof I affix my signature in presence of two witnesses.

CHARLES W. BLAKE.

Witnesses:
SETH V. PECK,
A. C. GARRETT.